US006954006B2

(12) United States Patent
Williams, Jr.

(10) Patent No.: US 6,954,006 B2
(45) Date of Patent: Oct. 11, 2005

(54) HYDROELECTRIC SYSTEM

(76) Inventor: Fred E. Williams, Jr., 1149 Platt Cir., Dayton, OH (US) 45407

( * ) Notice: Subject to any disclaimer, the term of this patent is extended or adjusted under 35 U.S.C. 154(b) by 143 days.

(21) Appl. No.: 10/705,417

(22) Filed: Nov. 10, 2003

(65) Prior Publication Data

US 2005/0099012 A1 May 12, 2005

(51) Int. Cl.[7] ................................................ F03B 13/00
(52) U.S. Cl. ................................. 290/54; 290/43; 415/7
(58) Field of Search ............................. 290/42, 43, 53, 290/54; 415/1, 2, 3, 4, 7

(56) References Cited

U.S. PATENT DOCUMENTS

| 3,986,787 | A | * | 10/1976 | Mouton, Jr. et al. | ............ | 415/7 |
| 4,152,895 | A | * | 5/1979 | Wirt | ............................. | 60/398 |
| 4,179,886 | A | * | 12/1979 | Tsubota | ........................ | 60/398 |
| 4,335,319 | A | * | 6/1982 | Mettersheimer, Jr. | ........ | 290/54 |
| 4,363,213 | A | * | 12/1982 | Paleologos | .................... | 60/505 |
| 4,468,153 | A | * | 8/1984 | Gutierrez Atencio | ........ | 405/78 |
| 4,914,841 | A | * | 4/1990 | Weinrib | ....................... | 37/195 |
| 5,440,176 | A | * | 8/1995 | Haining | ........................ | 290/54 |
| 6,109,863 | A | * | 8/2000 | Milliken | ......................... | 415/1 |
| 6,472,768 | B1 | | 10/2002 | Salls | ........................... | 290/54 |
| 6,731,018 | B1 | * | 5/2004 | Grinsted et al. | ............... | 290/42 |

* cited by examiner

Primary Examiner—Nicholas Ponomarenko
(74) Attorney, Agent, or Firm—R. William Graham

(57) ABSTRACT

A hydroelectric system for disposal in a continuous flowing water vein includes at least one generator and a housing configured to include a venturi flow restriction for accelerating flow to the generator.

4 Claims, 4 Drawing Sheets

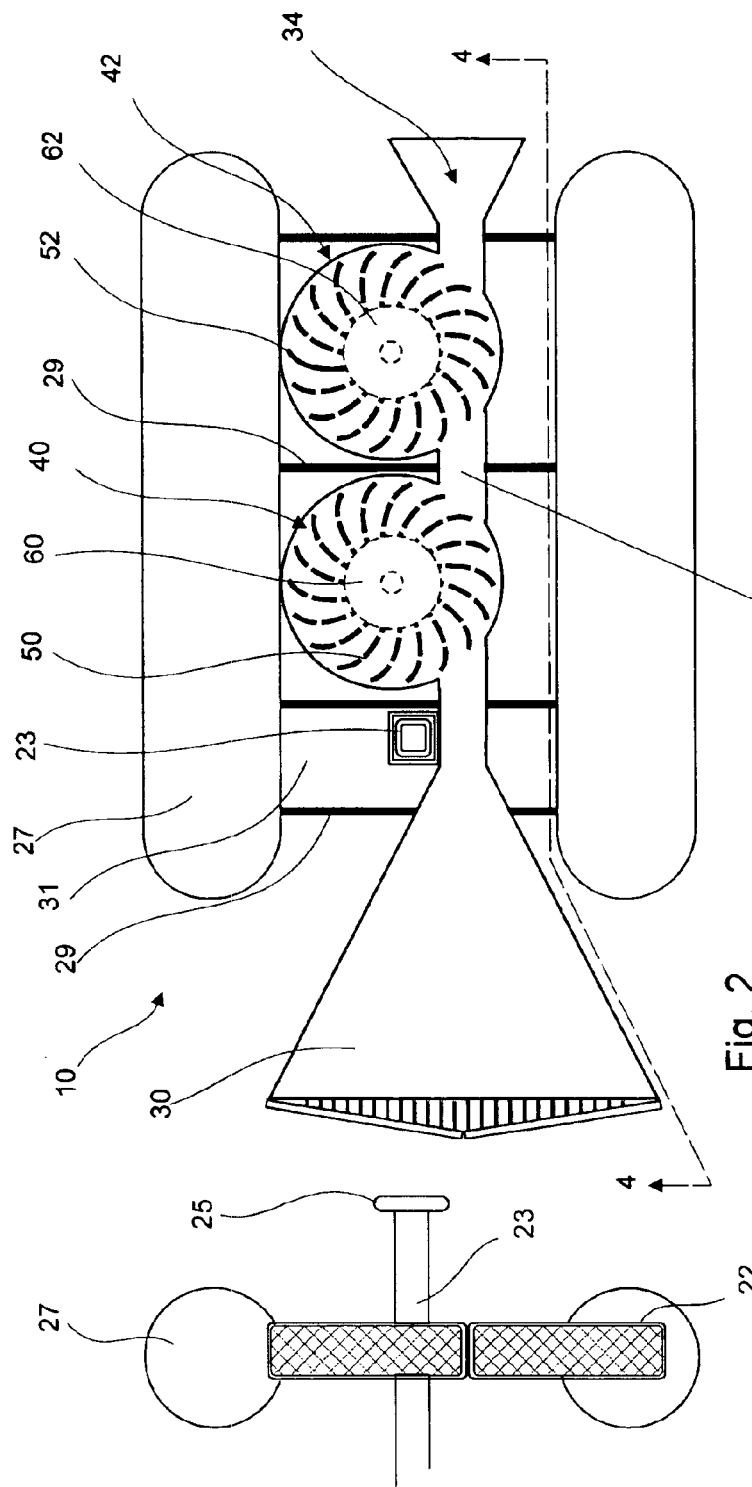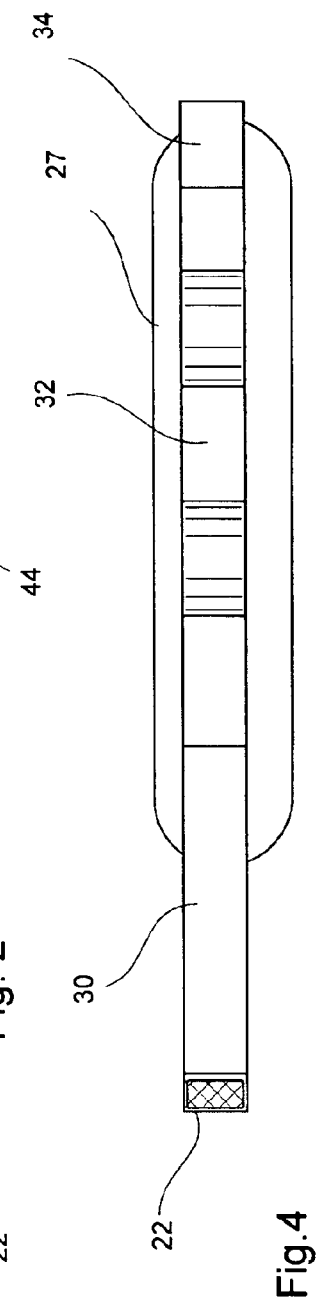
Fig. 2
Fig. 3
Fig. 4

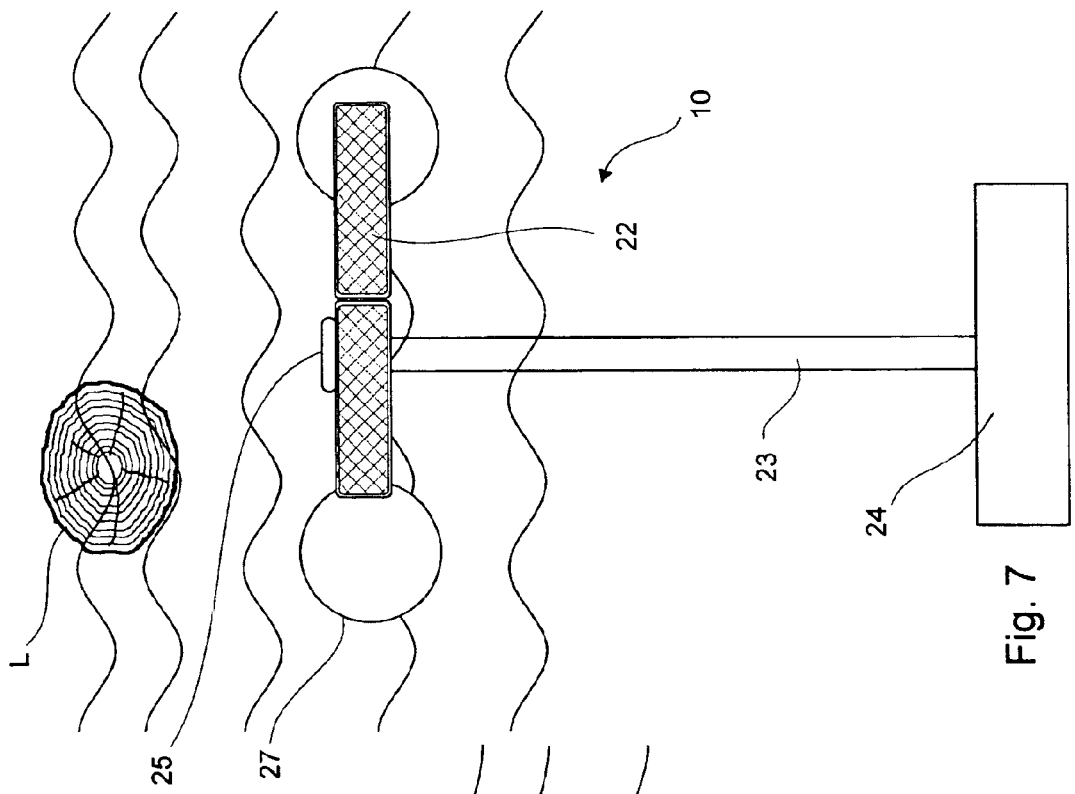
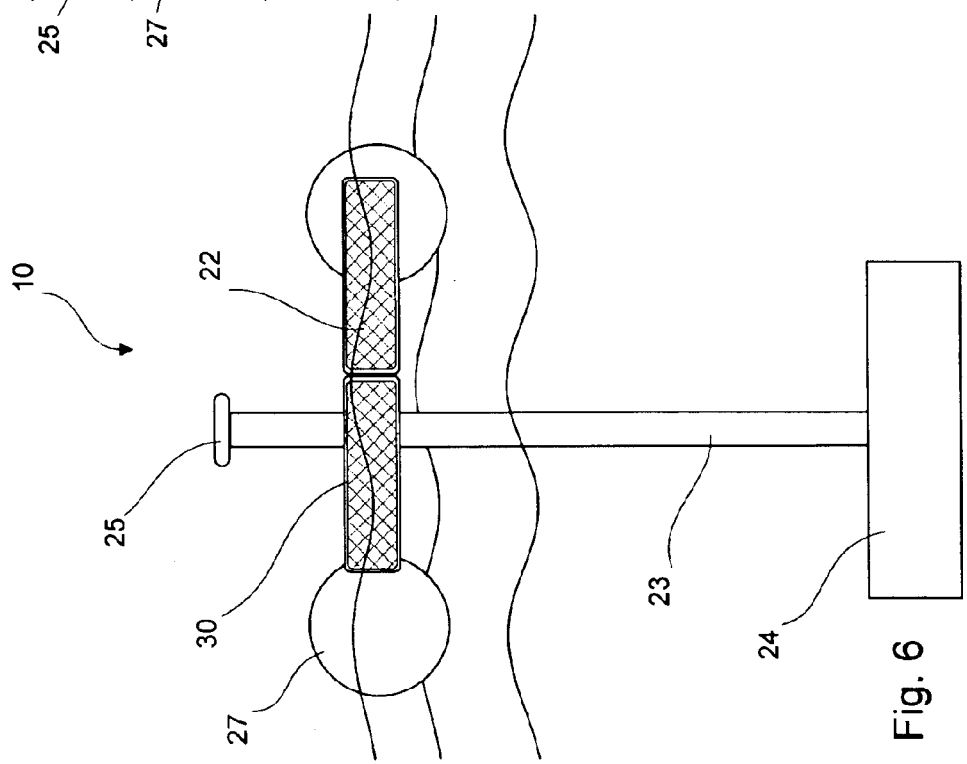

HYDROELECTRIC SYSTEM

BACKGROUND OF THE INVENTION

1. Field of the Invention

The present invention relates to a hydroelectric system and, more particularly, to a hydroelectric system which is operably disposed in a river which uses a turbine generator which receives water accelerated past a venturi flow restriction.

2. Description of the Prior Art

Relatively small, non-navigable rivers flow through, or in close proximity to, each and every major U.S. city. A pressure force is exerted at each and every point along such a river. U.S. Geological Survey flow rate data suggest that U.S. rivers flow continuously. For example, the Mad, Stillwater and Great Miami Rivers which flow through Dayton, Ohio, United States of America were studied for design purposes and it was found that there has never been a time over the last eighty-eight years when an appreciable flow was not manifest. These observations imply that such rivers provide a readily-available energy source.

This readily-available energy source has been overlooked because existing methods applied to low flow rates, low head, shallow channel depths and slow flow velocities do not generate substantial amounts of power, nor are they cost effective. Existing methods also posed regulatory concerns, primarily because of their potentially negative affect on fish and other marine life. An additional problem or concern with rivers is their inherent level changes due to rain and in turn flooding which introduces significant debris into the river and can pose potential damage to hydroelectric sources in their flow path.

Thus, there remains a need in the art for hydroelectric system designed for use in relatively small, non-navigable rivers which addresses deficiencies inherent in the prior art.

SUMMARY OF THE INVENTION

It is an object to improve hydroelectric systems.

It is an object to provide a hydroelectric system which can be deployed in a continuously flowing water vein.

It is another object to provide a hydroelectric system which is less prone to damage caused by debris during flooding conditions.

It is another object to provide an environmentally friendly energy producing system.

This need and others are addressed by means of novel hydroelectric system which is operably disposed in a continuously flowing water vein, such as a river, that is a significant departure from existing systems and methods and which has the potential to deliver massive amounts of pollution-free electricity to each and every utility service area. The system is applicable to any site or situation where there is a continuous flow, without significant negative environmental or ecological effects. For example, fish remain free to swim upstream and downstream unhindered. The novel hydroelectric system is designed to generate cost-effective power at substantially any point along a flowing river.

Preferred hydroelectric system in accordance with the invention includes a turbine-generator which receives water accelerated past a venturi flow restriction as opposed to a dam. The entire assembly is capable of being water submersible and preferably partially submersed, and is simply placed within the flow. This modular generating unit can include a floatation device and is mounted on, and anchored by, a concrete slab preferably via a slide post(s) having a stop thereon to limit vertical travel of the unit, which is heavy enough to hold it securely in place regardless of flow rate. The slab is positioned on the bottom floor of the water vein to eliminate any questions as to aesthetics, with the unit at or below water level to achieve the objectives herein.

Other objects and advantages of the invention will be apparent from the following description, the accompanying drawings and the appended claims.

BRIEF DESCRIPTION OF THE DRAWINGS

FIG. 2 includes top plan view of part of the hydroeletric system of FIG. 1;

FIG. 3 includes an endview of part of the hydroeletric system;

FIG. 4 includes side view of the hydroeletric system of FIG. 1 through line 4—4;

FIG. 6 depicts an optimal operating height of the hydroelectric system during normal water level height; and FIG. 7 depicts a safe operating mode during a flooding condition.

DETAILED DESCRIPTION OF THE PREFERRED EMBODIMENT

Figure 1:
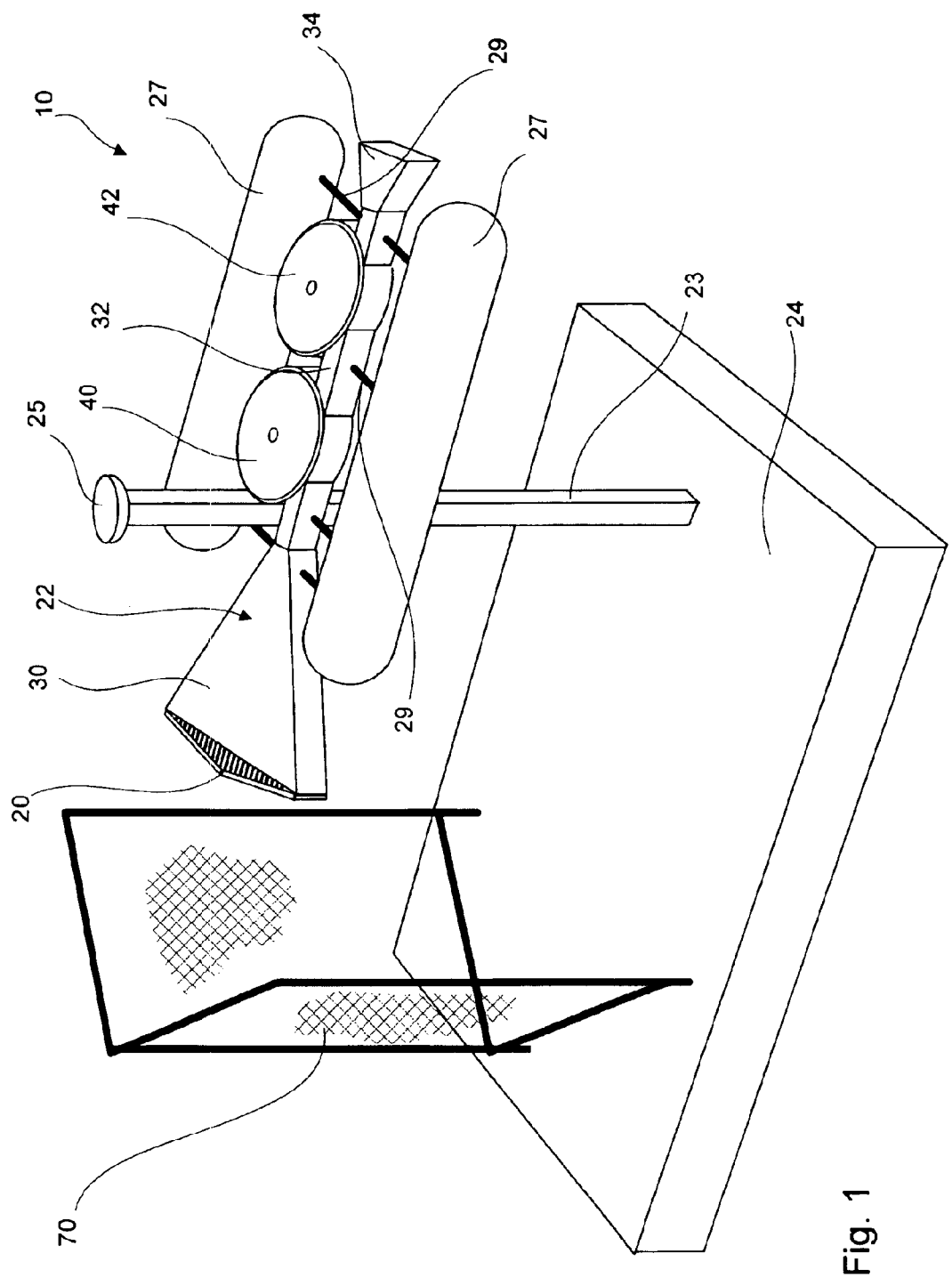
FIG. 1 is a perspective view of preferred hydroeletric system in accordance with the invention.

With reference to FIG. 1, preferred hydroelectric system 10 in accordance with the invention comprises a filter frame 20, a housing 22 and a concrete base 24. The housing 22 is slidably connected a vertical post 23 which extends upward from the concrete base 24. The vertical post 23 includes a stop portion 25 at an upper end which limited the upper vertical travel of the housing 22 with the lower vertical travel limited by the concrete base 24. While the base 24 is made of concrete, it is conceived that other suitable water submergible material can be used with the base being of a sufficient weight and corrosion resistance to serve as a stable stationary footing for the system 10 when the base 24 is placed on a floor of a water vein.

The preferred filter frame 20 mounts a conventional filter or screen (not shown) which filters water taken into the housing 22. The preferred housing 22 defines an inlet section 30, an intermediate section 32 and an outlet section 34. Floats 27 are laterally disposed to the housing 22 and connect to the housing 22 via bars 29, wherein a pair of the bars 29, part of the housing 22 and float 27 form a retention area 31 about the bar 23, the area 31 being small enough to maintain the housing 22 in a relatively horizontally located position while permitting vertical movement between the stop 25 and slab 24.

With reference to FIG. 2, the preferred intermediate section 32 defines a first turbine 40, a second turbine 42 and an intermediate flow path 44. A first impeller 50 is housed in 30 the first turbine 40 and a second impeller 52 is housed in the second turbine 42. The first and second impellers 50, 52 each communicate with the intermediate flow path 44. The first turbine 50 is coupled to a first generator 60 and the second turbine is generators 60, 62 are shown, the number and design of the impellers and generators is not critical to the invention.) The preferred inlet section 30 and the preferred outlet section 34 each taper inwardly so as to form a venturi flow restriction at the intermediate flow path 44.

A venturi flow restriction in this case looks similar to a funnel, widely opening on the upstream side and progressively smaller on the downstream side. The venturi effect is an accentuated expression of a river's natural flow characteristics. The width of a river varies. Flow through broad areas is slow and may appear stationary, but as flow continues through narrow areas, the speed of flow drastically increases. The amount of speed increase is based on the difference in the size of the upstream and downstream flow areas. The greater the difference in their sizes, the greater the speed of their increase and the present system capitalizes on this. By employing the floats 27, the housing 22 can be maintained partially submerged in the water during normal water levels. This can be seen in FIG. 6, wherein the inlet section 30 is partially submerged to permit water flow in therein and by so doing as the water speeds up due to the venture effect the water level can rise inside the housing 22 as it approaches the intermediate section 32. The venturi flow restriction mimics a narrowing river. The objective is to accelerate flow to a speed where generators operate efficiently.

Figure 5:
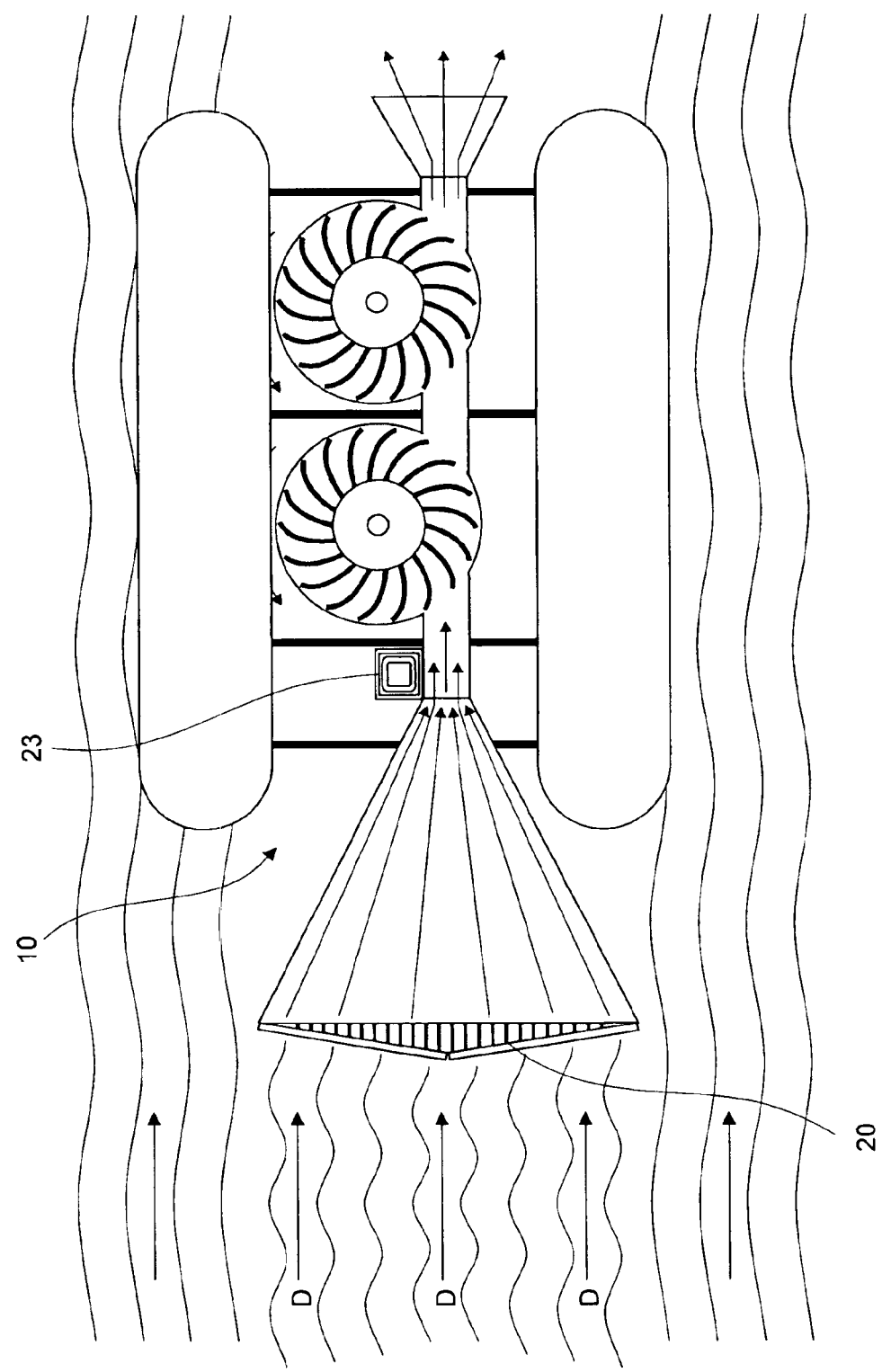
FIG. 5 depicts the hydroelectric system of FIG. 1 deployed in a water current.

As shown in FIG. 5, the hydroelectric system 10 preferably will be positioned at partially underwater in a river or stream and oriented so that the filter frame 20 and the inlet section 30 of the housing 22 face the river flow direction D. The hydroeletric system 10 will be generally held in vertical place by the bar 28 in the restricted area 31 and permitted limited vertical travel along the length of the bar 28. Preferably, the first and second generators 60, 62 will be coupled by conventional means to structure for transmitting power from the first and second generators 60, 62 to a desired destination (not shown).

The venturi's size is determined by factoring the natural speed of a river to desired power production. A slower-flowing river or stream will require a larger venturi than a faster-flowing river to produce the same amount of power. It is preferred that the design of the present be such that in no case will a venturi span a significant part of the river width, for example, more than one-quarter of a river's width and, as such, fish and other marine life will remain free to swim upstream and downstream unhindered. It is anticipated that that several generating units can be installed downstream, then another and another and so on providing for a very broad range in the amount of power that can be generated from a given river. For example, it is believed that the three navigable rivers flowing through Dayton, Ohio could support all of the utility service area's power requirements when this method is applied. Nationwide projections are large enough to displace coal and to serve as the base energy source to synthesize hydrogen as an alternative automotive fuel.

System 10 can preferably include a diverting screen 70 which fixed to the slab 24 and extends upward therefrom a height approximate that of the height of bar 23 and a width at least that of the housing with accompanying floats 27. The screen 70 would aid in preventing large debris from damaging the same, but permit small object, including fish to pass therethrough. It is also contemplated that the system 10 will incorporate diffusers and diverters (not shown) to eliminate exhaust turbulence. With reference to FIG. 5, flow enters the housing 22 at the natural speed of the river. The flow is accelerated in the inlet section 30. The flow then is tapped by the first and second impellers 50, 52. The flow then is deflected (that is, spread out) and diffused (that is, slowed down toward the natural speed of the river) by the outlet section 34.

FIG. 7 illustrates a safe operating mode during high water levels as when a flood occurs. The stop 25 thus prevents the housing 22 from raising into flood water levels and thus stays below potentially damaging debris such a log L.

It is believed that the hydroelectric system of the invention provides a simple and intuitive means to generate massive quantities of pollution-free electricity and to effectively address regulatory concerns. By so providing the invention, a device is provided which uses the flow rate in the river which is faster at the surface than toward the bottom or below surface water of the river. Although this invention has been described in conjunction with certain specific forms and modifications thereof, it will be appreciated that a wide variety of other modifications can be made without departing from the spirit and scope of the invention.

What is claimed is:

1. A hydroelectric system for disposal in a continuous flowing water vein, comprising:
   at least one generator,
   a housing configured to include a venturi flow restriction for accelerating flow to said at least one generator,
   a float connected to said housing, wherein
   said housing includes an inlet and an outlet having said venture flow restriction therebetween and which includes a screen operably disposed adjacent said inlet to prevent debris from entering said housing without substantially affecting water flow therethrough, wherein
   said screen is connected to said housing,
   a base for placement on a floor of the water vein and which is configured to remain stationary on the floor,
   a vertical bar extending upward from said base, wherein
   said housing is movably connected to said bar such that said housing is limited to travel between a stop on said bar and said base.

2. The hydroelectric system of claim 1, wherein said housing includes an inlet and an outlet having said venture flow restriction therebetween and which includes a screen operably disposed adjacent said inlet to prevent debris from entering said housing without substantially affecting water flow therethrough.

3. The hydroelectric system of claim 2, wherein said screen is connected to said housing.

4. The hydroelectric system of claim 2, wherein said screen is connected to said base.

* * * * *